United States Patent
Patberg et al.

(10) Patent No.: US 6,779,830 B2
(45) Date of Patent: Aug. 24, 2004

(54) ANTI-INTRUSION BEAM FOR A VEHICLE DOOR ASSEMBLY

(75) Inventors: Lothar Patberg, Aachen (DE); Peter Stockmann, Grefrath (DE); Roy Eugene Bonnett, Bloomfield, MI (US); Gregory T. Bretz, Canton, MI (US); Patrick Blanchard, Dearborn, MI (US); Saravanan Subramanian, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/249,430

(22) Filed: Apr. 8, 2003

(65) Prior Publication Data

US 2003/0189357 A1 Oct. 9, 2003

Related U.S. Application Data

(60) Provisional application No. 60/371,098, filed on Apr. 9, 2002.

(51) Int. Cl.[7] .................................................. B60J 5/00
(52) U.S. Cl. .................................................. 296/146.6
(58) Field of Search .................. 296/146.6, 187.03, 296/187.12

(56) References Cited

U.S. PATENT DOCUMENTS

| | | | | |
|---|---|---|---|---|
| 4,290,641 A | * | 9/1981 | Miyauchi et al. | 296/146.6 |
| 4,369,608 A | * | 1/1983 | Miura et al. | 296/146.6 |
| 4,662,115 A | | 5/1987 | Ohya | 49/502 |
| 4,671,550 A | * | 6/1987 | Molnar | 293/120 |
| 4,919,473 A | | 4/1990 | Laimighofer | 296/188 |
| 5,536,060 A | | 7/1996 | Rashid | 296/146.6 |
| 5,558,368 A | * | 9/1996 | Cerny et al. | 280/781 |
| 5,614,305 A | * | 3/1997 | Paine et al. | 428/301.1 |
| 5,908,216 A | * | 6/1999 | Townsend | 296/146.6 |
| 5,924,760 A | | 7/1999 | Krajewski | 296/146.6 |
| 5,944,373 A | | 8/1999 | Seksaria | 296/57.1 |
| 6,068,327 A | | 5/2000 | Junginger | 296/146.13 |
| 6,213,540 B1 | * | 4/2001 | Tusim et al. | 296/187.02 |
| 6,641,893 B1 | * | 11/2003 | Suresh et al. | 428/105 |

FOREIGN PATENT DOCUMENTS

| | | | | |
|---|---|---|---|---|
| JP | 104467 | * | 6/1982 | 296/146.6 |
| JP | 404066323 | * | 3/1992 | 296/146.6 |

* cited by examiner

Primary Examiner—Dennis H. Pedder
(74) Attorney, Agent, or Firm—Gigette M. Bejin

(57) ABSTRACT

An anti-intrusion beam for incorporation into a vehicle door assembly is manufactured from an outer skin formed from laminated layers of composite materials having fiber reinforcement oriented in a directional pattern in each respective layer. The anisotropic beam includes body members having an interior core formed of high density foam plastic. The transversely corrugated beam includes attachment areas that have the same corrugated configuration which are fastened to mounting lugs of an inner door panel arranged in a corresponding corrugation. Variations in the thickness and formation of the layers of the outer skin can be used to control the failure of the beam during impact to provide a progressive predicable failure pattern for the beam. A frame catcher can be inserted into the body portions of the anti-intrusion beam to permit the transfer of impact forces to the frame of the vehicle.

15 Claims, 7 Drawing Sheets

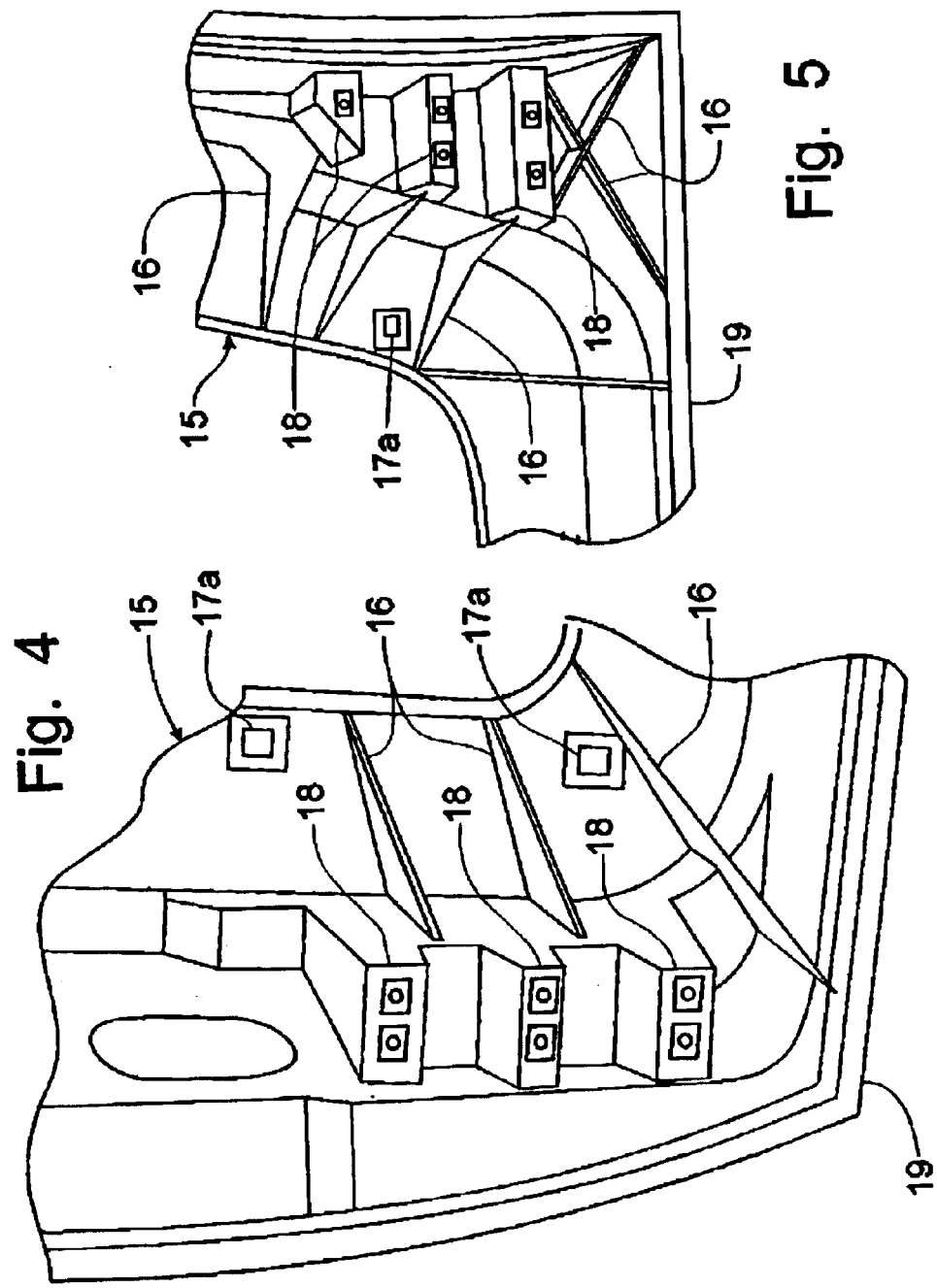

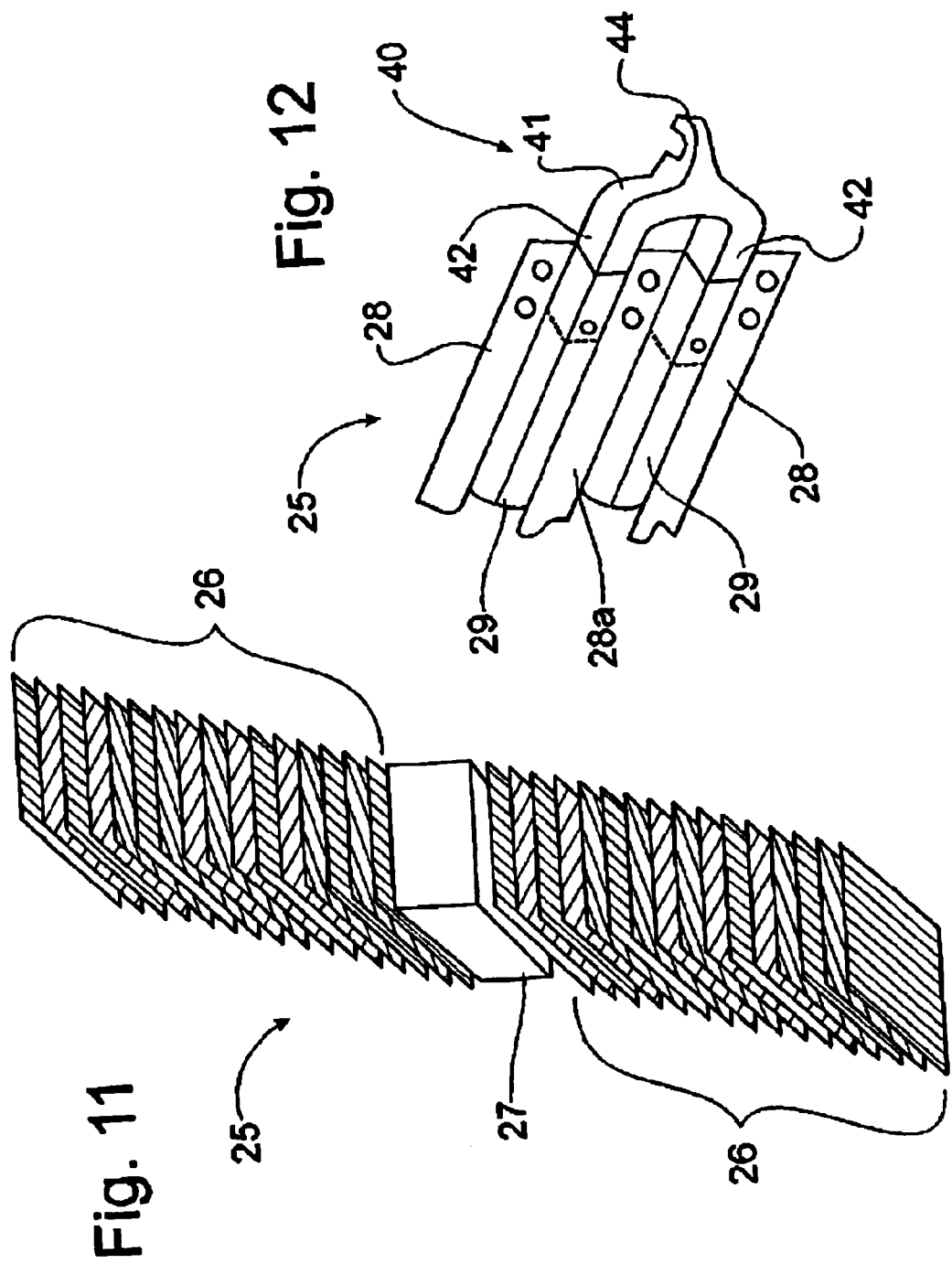

ANTI-INTRUSION BEAM FOR A VEHICLE DOOR ASSEMBLY

CROSS REFERENCE TO RELATED APPLICATIONS

This application claims domestic priority on U.S. Provisional Patent Application Serial No. 60/371,098, filed Apr. 9, 2002, the contents of which are incorporated herein by reference.

BACKGROUND OF INVENTION

1. Field of the Invention

This invention relates to the reduction of weight in automotive vehicles, and, more particularly, to a door assembly utilizing magnesium to reduce weight and increase fuel economy.

2. Background of the Invention

During the last decade, manufacturers of automobiles have undertaken steps to reduce weight of the vehicles in order to improve fuel economy and to reduce vehicle emissions. Such efforts have included the design of automotive vehicle components utilizing light metal alloys, leading to a variety of applications in chassis and power train components. More recently, advances in high-pressure die-casting technologies have enabled these technologies to be applied to larger structural components. Noteworthy examples of such larger components are instrument panel reinforcements, seat frames and door closure panels. While weight reductions of 40% can be realized through the use of magnesium, product engineers are faced with new challenges to incorporate adequate stiffness and crash critical applications with a material system possessing lower modulus and ductility compared to conventional formed sheet metal construction of such components.

Increasing the numbers of materials to be utilized in the construction of large structural components for automotive vehicles requires alternative joining strategies for the disparate materials in the assembly of such structural components. Consideration must be given to galvanic corrosion, as well as to differences in thermal expansion rates. Other related issues include the integration of the new materials and assembly techniques into the existing framework of an automotive manufacturing and assembly plant.

In U.S. Pat. No. 5,536,060, issued to Moinuddin Rashid, et al. on Jul. 16, 1996, an automotive door assembly is disclosed in which a reinforcement panel is attached to the interior side of the outer panel of the door assembly. This reinforcement panel is described as having superplastic forming qualities such as aluminum and stainless steel, but acknowledges that magnesium can be employed optionally, to provide the complex shape required in the specific reinforcement panel designed for the disclosed application.

In U.S. Pat. No. 4,662,115, issued to Takegi Ohya, et al. on May 5, 1987, an automotive vehicle door assembly is disclosed incorporating the employment of an inner panel formed of steel and an outer panel formed of synthetic resin. The hinge and door closure and locking devices are mounted on the steel inner panel.

U.S. Pat. No. 5,924,760, was issued to Paul Krajewski, et al. for a one piece corrugated anti-intrusion barrier for an automotive vehicle door. This anti-intrusion barrier is preferably formed in a corrugated configuration from a piece of sheet metal stamped into the preferred form. These barrier panels are preferably formed from aluminum alloys, though other materials including magnesium, steel, and titanium can be alternatively utilized.

U.S. Pat. No. 5,944,373, issued to Dinesh Seksaria on Aug. 31, 1999, is directed to a lightweight tailgate assembly for a pick-up truck in which a plastic reinforcing member is positioned between two metal panels to form the completed tailgate assembly. The inner and outer tailgate panels may be formed of aluminum or magnesium to minimize weight considerations.

In U.S. Pat. No. 6,068,327, issued to Michael Junginger on May 30, 2000, an upwardly folding rear cargo door for an automotive vehicle is disclosed. Junginger indicates that magnesium would be material preferred over aluminum, steel and plastic because of the reduction in weight of the assembly without the loss of strength. Junginger, however, does not disclose how a composite door structure incorporating magnesium with other structural materials can be effectively combined to create a vehicle door assembly.

U.S. Pat. No. 4,919,473, issued to Johann Laimighofer on Apr. 24, 1990, is directed to a structural beam for incorporation into an automotive vehicle door as an anti-intrusion device. Like the other references noted above, Laimighofer acknowledges that the structural beam may be formed from magnesium, but does not address the issues of how the disparate materials may be properly joined and deployed into a composite vehicle door assembly.

It would, therefore, be desirable to provide a composite automotive vehicle door assembly formed from disparate materials to provide a lightweight door assembly without sacrificing strength and intrusion resistance.

SUMMARY OF INVENTION

It is an object of this invention to overcome the aforementioned disadvantages of the known prior art by providing a composite vehicle door assembly utilizing disparate structural materials to form the components thereof.

It is another object of this invention to reduce the weight of a vehicle door assembly, when compared to conventional vehicular door assemblies, by using lightweight structural materials.

It is an advantage of this invention that fuel economy for automotive vehicles is increased while vehicle emissions are reduced.

It is a feature of this invention that improved joining strategies are provided to permit the effective mounting and connection of disparate structural component materials.

It is still another object of this invention to provide a composite vehicle door assembly that utilizes an outer door panel formed of aluminum, an inner door panel formed of magnesium, a mounted intrusion beam formed of composite materials, and an internal hardware module formed of thermoplastic.

It is another feature of this invention that the inner door panel can be manufactured from magnesium using high-pressure die-casting techniques.

It is still another feature of this invention that the assembly of the vehicle door components and the mounting of hardware and other components to the magnesium inner door panel is accomplished through the use of two-part inserts.

It is another advantage of this invention that the two-piece thermoplastic fastener inserts provides a dielectric barrier between the fastener and the magnesium inner door panel to prevent corrosion at the interface therebetween.

It is still another advantage of this invention that the fastener holes in the magnesium inner door panel can be formed by machining, piercing, or by casting in place followed by a clean-out during trimming.

It is yet another feature of this invention that the assembly of the aluminum outer door panel and the magnesium inner door panel can be accomplished through a hemming process.

It is yet another advantage of this invention that an increased flange hem thickness on the magnesium inner door panel casting provides an acceptable radius of curvature for the aluminum outer door panel to permit the utilization of a hemming process for assembly of the inner and outer door panel components.

It is yet another object of this invention to provide an affordable corrosion protection solution for use in a mixed material vehicular door assembly system that offers a satisfactory performance in the aggressive environment of a vehicle door closure.

It is a further feature of this invention that the magnesium inner door casting can be formed with a seal channel that encapsulates the seal mounted on the body of the vehicle.

It is a further advantage of this invention that the capture of the door seal within a formed seal channel improves noise reduction and performance of the seal.

It is a further feature of this invention to incorporate the hinges for the vehicle door assembly on the magnesium inner door panel.

It is a further object of this invention to provide a composite reinforcement beam to provide an anti-intrusion device for the vehicular door assembly.

It is still a further feature of this invention that the reinforcement member can be formed from an outer layer of a polymer composite material reinforced with glass or carbon fibers with an interior core of polyurethane.

It is yet another feature of this invention that the shaped interface between the composite reinforcing beam and the corresponding mounting lugs formed in the inner door panel increase improves the load transfer from the reinforcing beam to the inner door panel during impacts.

It is still a further advantage of this invention that the composite reinforcement beam has a reduced weight compared to conventional steel reinforcement beams.

It is yet a further feature of this invention that the vehicle door assembly incorporates a modular concept to decrease complexity of assembly.

It is still a further object of this invention to provide a door hardware module on which substantially all of the hardware required for the vehicle door can be mounted.

It is still another feature of this invention that the door hardware can be pre-assembled on a module component for installation on the inner door panel as a unit.

It is yet a further advantage of this invention that the assembly of a vehicle door is made less complex by reducing the number of assembly operations and by using a modular configuration.

It is still another feature of this invention that the inner door panel can be formed with integrated reinforcements cast into the panel to increase resistance to impacts without adding reinforcement attachments to the door structure.

It is a further object of this invention to provide a lightweight vehicle door assembly that is durable in construction, inexpensive of manufacture, carefree of maintenance, facile in assemblage, and simple and effective in use.

These and other objects, features and advantages are accomplished according to the instant invention by providing an anti-intrusion beam for incorporation into a vehicle door assembly. The outer skin is formed from laminated layers of composite materials having fiber reinforcement oriented in a directional pattern in each respective layer. The anisotropic beam includes body members having an interior core formed of high density foam plastic. The transversely corrugated beam includes attachment areas that have the same corrugated configuration which are fastened to mounting lugs of an inner door panel arranged in a corresponding corrugation. Variations in the thickness and formation of the layers of the outer skin can be used to control the failure of the beam during impact to provide a progressive predicable failure pattern for the beam. A frame catcher can be inserted into the body portions of the anti-intrusion beam to permit the transfer of impact forces to the frame of the vehicle.

BRIEF DESCRIPTION OF DRAWINGS

The advantages of this invention will become apparent upon consideration of the following detailed disclosure of the invention, especially when taken in conjunction with the accompanying drawings wherein:

FIG. 4 is an enlarged partial elevational view of the forward portion of the magnesium inner door panel depicting the area for mounting the reinforcement beam for the door assembly;

FIG. 5 is an enlarged partial elevational view of the rearward portion of the magnesium inner door panel depicting the area for mounting the reinforcement beam for the door assembly;

FIG. 11 is an enlarged expanded view of the layering forming the composite reinforcement beam, the respective layers of the outer skin reflecting representative arrangements of the fiber reinforcement in the respective layers thereof; and FIG. 12 is an enlarged perspective detail view of a frame catcher that is an optional insert for the composite reinforcement beam.

DETAILED DESCRIPTION

Figure 1:
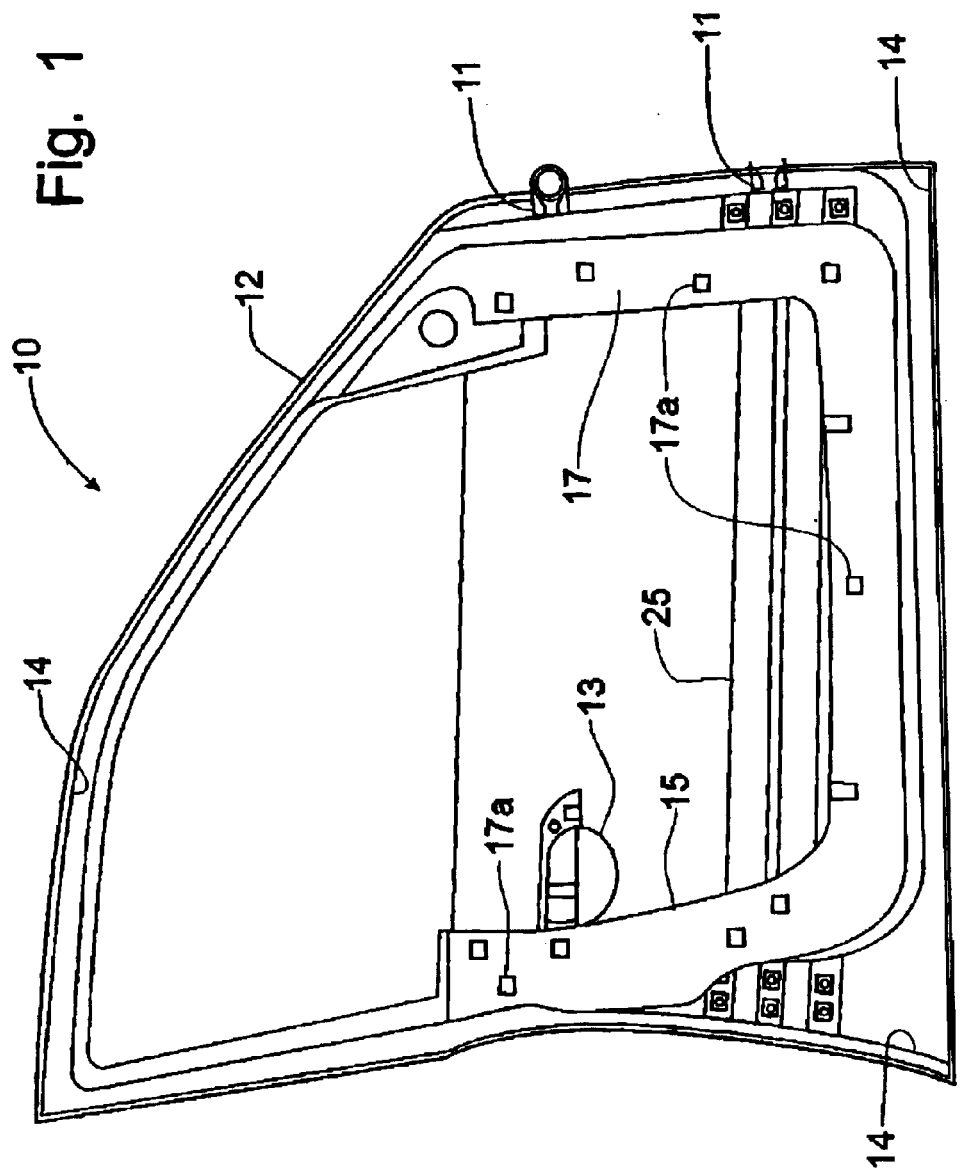
FIG. 1 is an elevational view of an assembled automotive vehicle door assembly incorporating the principles of the instant invention.
Figure 2:
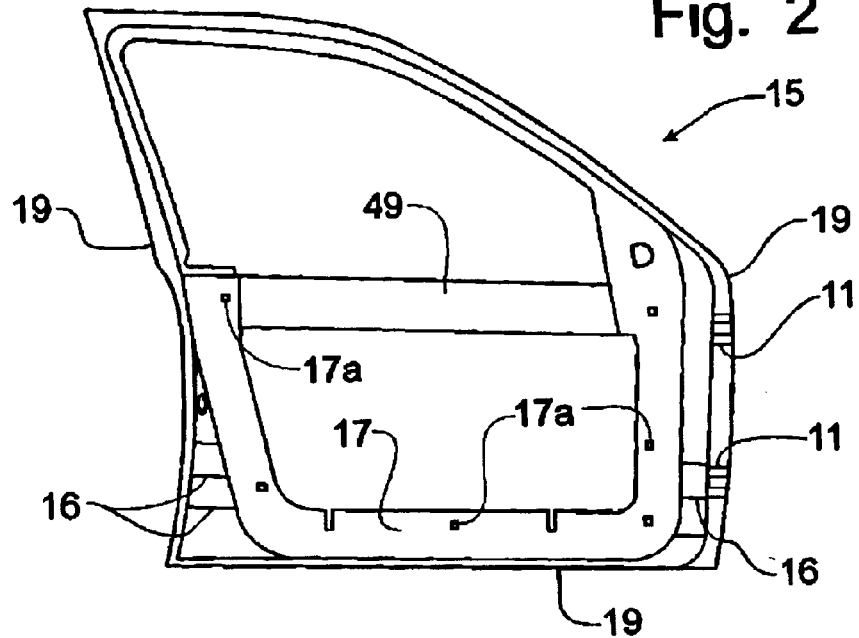
FIG. 2 is an elevational view of the magnesium inner door panel taken from the interior view with respect to the vehicle on which the door assembly is to be mounted.
Figure 3:
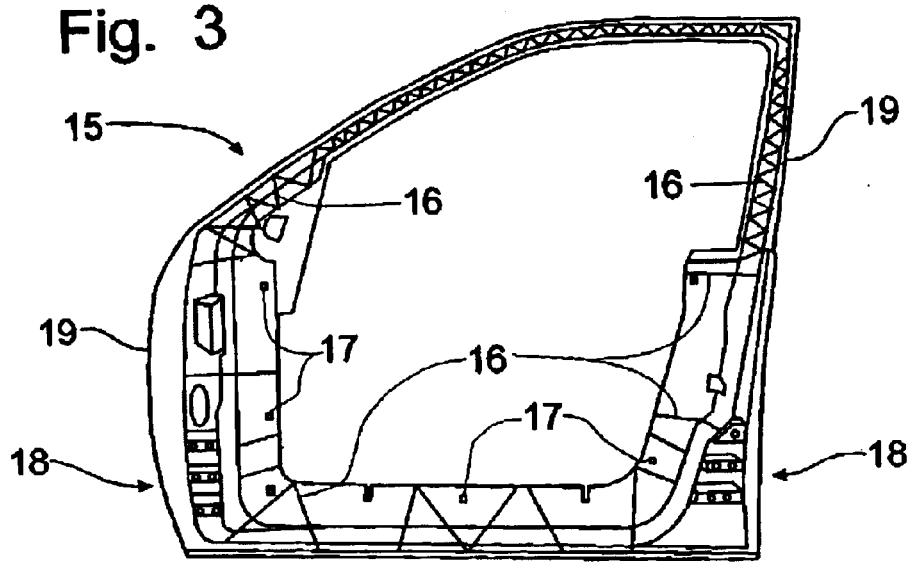
FIG. 3 is an elevational view of the magnesium inner door panel taken from the exterior view with respect to the vehicle on which the door assembly is to be mounted.
Figure 6:
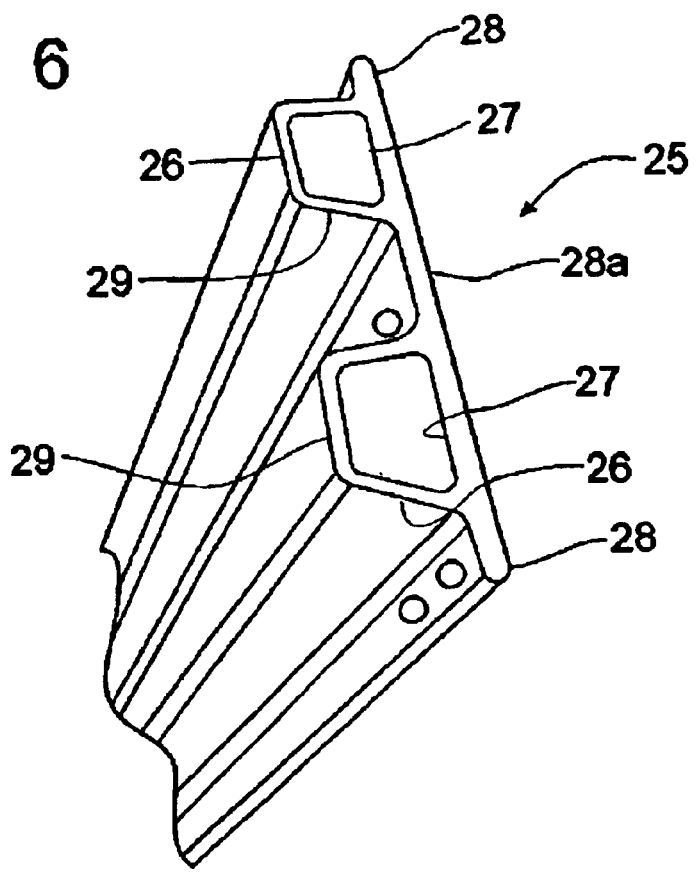
FIG. 6 is a partial perspective view of the composite reinforcement beam to be mounted between the inner and outer door panels.
Figure 7:
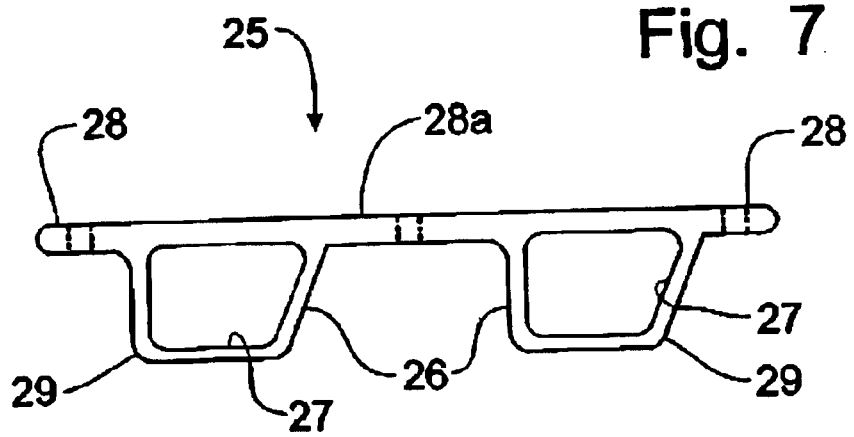
FIG. 7 is an end view of the composite reinforcement beam depicted in FIG. 6.

Referring to drawings, an automotive vehicle door assembly 10 incorporating the principles of the instant invention can best be seen. The outer panel 12 is preferably formed of aluminum or an aluminum alloy to provide lightweight characteristics desirable to reduce the overall weight of the door assembly 10 without sacrificing strength and integrity for the door assembly structure. Other suitable materials for the construction of the outer panel 12 would be steel, polypropylene, or composite materials, which can provide similar weight reduction characteristics as aluminum alloys. The outer panel 12 is conventionally provided with openings 13 for the door handles and latching hardware (not shown).

The inner door panel 15 is preferably formed from magnesium cast through high-pressure die-casting techniques to provide lightweight, yet strong and durable, characteristics for the completed door assembly 10. The inner panel 15 has a formed configuration to mate with the outer door panel 12 and with a hardware mounting module 20, as will be described below, such that the inner door panel 15 will be sandwiched between the outer door panel 12 and the module 20. The inner door panel 15 has a formed shape that will provide strength and rigidity for the assembled door 10 and includes reinforcement ribs 16 appropriately positioned around the formed perimeter of the inner panel 15 and a mounting face 17 for the attachment of the modular hardware attachment panel 20. The inner door panel 15 is sufficiently strong as to permit the hinges 11 pivotally connecting the door assembly 10 to the vehicle to be formed as an integral part of the inner door panel structure 15.

The reinforcement of the inner door panel 15, through the formation of the reinforcing ribs 16 at appropriate locations on the inner door panel 15, permits selective stiffness and flexibility to be designed into the vehicle door 10. One particular advantage to the location of reinforcing ribs 16 at the top of the door 10 is a greater performance in vehicle rollover situations where the greater torsional stiffness at the top of the door 10 will resist separation of the door 10 from the body frame. Furthermore, an upper belt line reinforcement 49 can be selectively added to the inner door panel 15 when desired to increase stiffness of the door 10 for mounting the outer panel 12 and the hardware mounting module 20.

Figure 8:
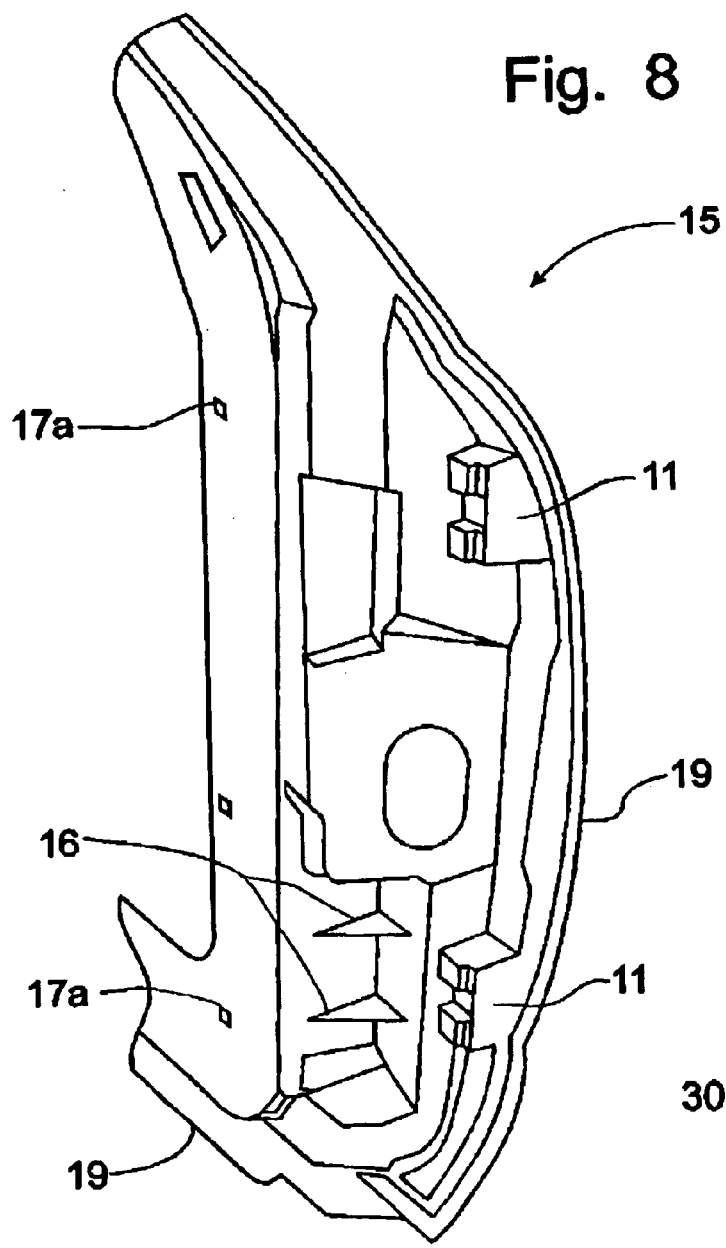
FIG. 8 is a partial perspective view of the forward end of the inner door panel depicting the hinge mounting areas integrally formed therein.
Figure 8A:
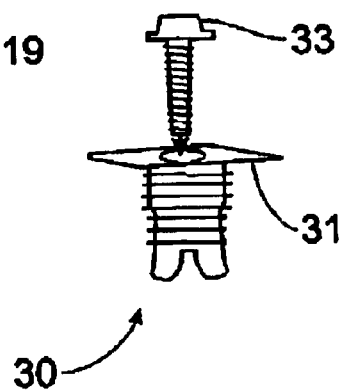
FIG. 8A is a schematic elevational view of a two-piece fastener system having an insert member and a fastener engaged with the insert member.

Holes 17a through the magnesium inner door panel 15 can be formed through machining, piercing, or simply cast in place. To avoid galvanic corrosion at the interface between fasteners and the magnesium inner door panel, the fasteners are preferably not of the self-tapping variety, as is conventional in automotive vehicle doors. Preferably, a two-piece fastener system 30, such as a VARIOboss™ fastener schematically depicted in FIG. 8A, in which a polydactyl insert 31 is first pressed into the opening 17a in the magnesium inner door casting so that the fastener 33 can engage the insert 31, is used to mount components to the inner door panel 15, or the module 20 as described below, to dielectrically insulate the fasteners 33 from the magnesium inner door panel 15.

Such a fastener system 30 compensates for any variation in the opening 17a and in the material due to tolerances in the material thickness. Two and four way locators are molded into the hardware module panel 20 to align the module 20 with the inner door panel 15 before making the final door handle connections and inserting the steel screw fasteners therefore. The thermoplastic inserts 31 and locators isolate the respective screws and provide a dielectric barrier to prevent corrosion at the interface.

As is reflected in the drawings, a modular architecture is designed into the door assembly 10. As with most automotive applications, closure design is driven primarily by stiffness requirements. The flexibility of the die-casting process for the magnesium inner door panel 15 provides an opportunity to integrate reinforcements and rely on section design to offset any reduction in intrinsic stiffness. Where needed, additional stiffness and strength may be realized by changes in section properties in localized regions of the casting, such as through the utilization of the reinforcing ribs 16.

Such design capabilities, avoids any incompatibility issues between the magnesium inner door panel 15 and internal reinforcement panels. Furthermore, use of the die-casting techniques for the inner door panel 15 enables features such as fastener and access holes 17a, sealing channels 40 and styling options, like deep draws, to be included in the raw casting at minor tooling expense, as compared to secondary machining and assembly operations that would be required with conventional sheet metal design to add such features to the component part.

Figure 9:
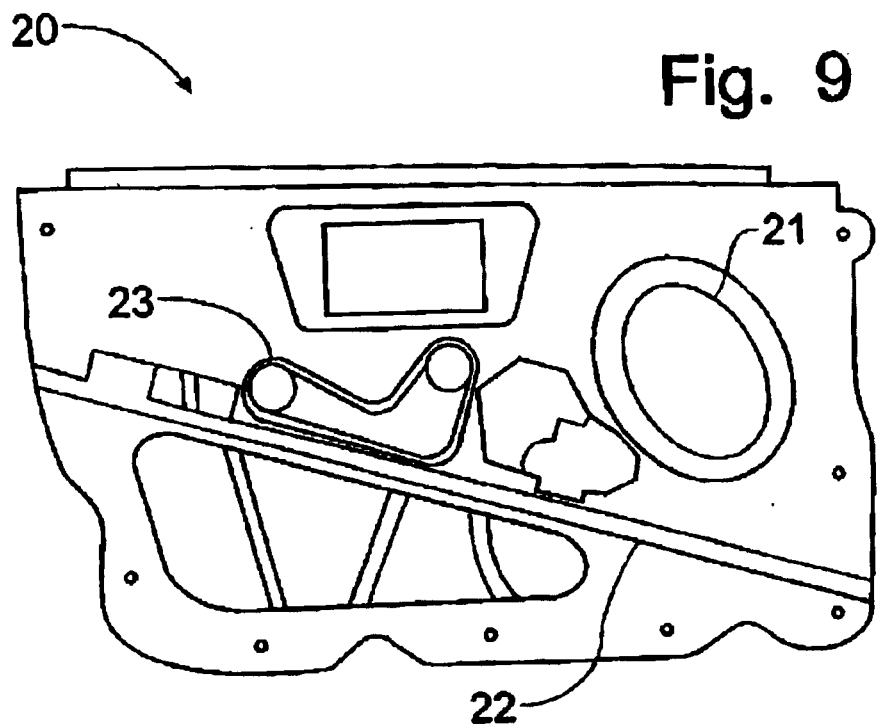
FIG. 9 is a schematic elevational view of the inner plastic hardware module panel viewed from the interior side with respect to the vehicle onto which the door assembly is to be mounted, which is the side of the module panel positioned next to the inner door panel seen in FIGS. 2 and 3.
Figure 10:
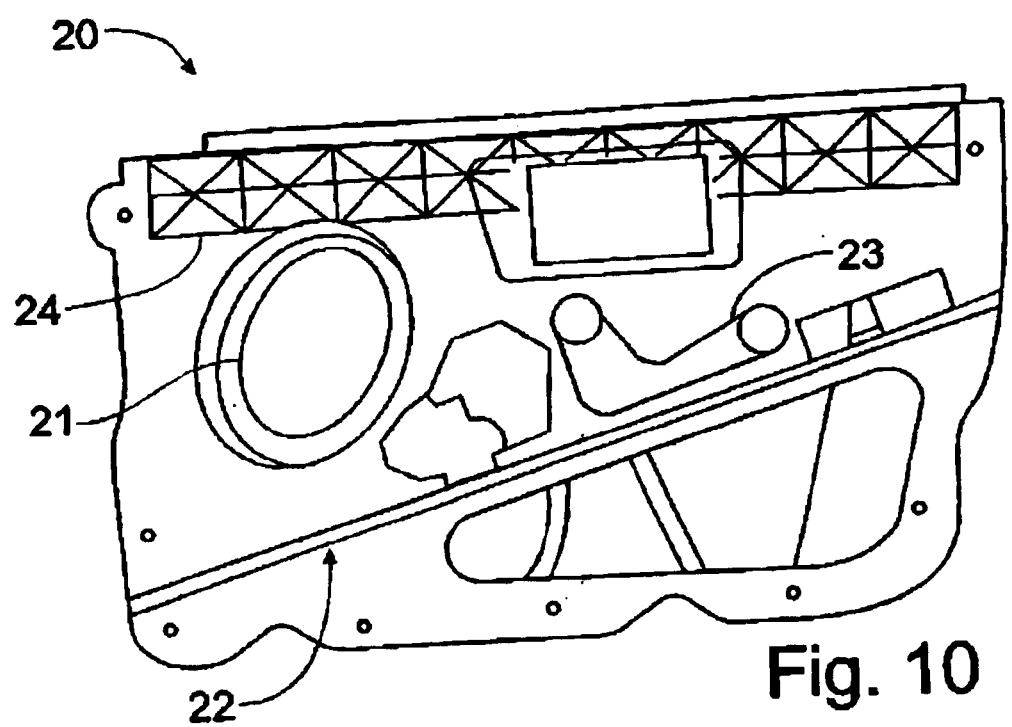
FIG. 10 is a schematic elevational view of the inner plastic hardware module viewed from the exterior side, also known as the trim side, with respect to the vehicle onto which the door assembly is to be mounted.

Referring now to FIGS. 9 and 10, the hardware mounting module 20 can best be seen. The module panel 20 is designed to carry the majority of the conventional door hardware components, thus reducing the number of assembly steps required for the manufacture of the completed door assembly 10. The module panel 20 is preferably formed via compression molding from long fiber reinforced thermoplastic. The fiber reinforcement, which can represent up to 40% of the mass of the panel 20, serves to increase tensile modulus and strength. Distribution of the fibers along the length of the living hinge 22 also increases service performance enabling access to the internal space of the assembly 10, by bending up the lower portion of the panel 20, on multiple occasions without significant deterioration of the module panel 20.

The module panel 20 is also formed with belt line reinforcement in the form of ribs 24 along the belt line to meet design stiffness requirements and resist any service loads associated with the weather strip and window glass regulators. Water sealing of the internal door cavity can be accomplished by utilizing an expandable foam that is applied to a sealing channel (not shown) on the module panel 20. The foam sealant eliminates requirements for an additional water shield that would otherwise be applied during a conventional vehicle door assembly process.

Preferably, the hardware mounting module will have mounted thereon the normal door hardware items so that the completed module 20 can be fastened to the inner door panel 15 as a module. For example, the speaker hole 21 can be molded into the module 20 for the mounting of the stereo speaker (not shown) final assembly. A depression 23 for the door handle can be formed into the module 20, along with the mounting of the motor for regulating the door glass. Furthermore, a sealing channel can also be molded into the module in the same manner as for the inner door 15 as will be described in greater detail below. The module 20 is attached to the mounting face 17 formed in the inner door panel 15 with the two piece fasteners 30 engaging the openings 17a in the mounting face 17.

Referring now to FIG. 17, the incorporation of an anti-intrusion, reinforcement beam 25 into the modular door assembly 10 can best be seen. The reinforcement beam 25 is preferably formed as a composite having an outer skin layer 26 of a polymer reinforced with glass and carbon fibers and an interior core 27 of polyurethane. To achieve weight reduction objectives, the reinforcement beam can also be formed of aluminum or an aluminum allow; however, the composite material offers a 25% reduction in weight, compared to a conventional high strength steel reinforcement beam. The reinforcement beam 25 is formed in a corrugated configuration with opposing side attachment flanges 28 that have appropriate openings formed therein for the passage of fasteners connecting the reinforcement beam 25 to the inner door panel 15. Between the attachment flanges 28 and a central attachment web 28a, the reinforcement beam 25 is formed with the stiffening body members 29 that provide the anti-intrusion resistance.

The composite reinforcement beam 25 is formed in a layered configuration, as is depicted in FIG. 11. The outer skin 26 is formed of many layers of a glass or carbon fiber reinforced polymer to provide an anisotropic reinforcing beam. Preferably, the fibers are oriented in different directions in succeeding layers to optimize the stiffness and the strength of the final composite outer skin 26. For the body members 29, the interior core 27 is sandwiched between opposing outer skins 26 which are formed of multiple layers with the fibers oriented in differing directions. Furthermore, the fibers on any particular layer could be glass or carbon fibers.

By designing the layers of the outer skin 26 in a selective manner, the reinforcing beam 25 can be made to fail in a predetermined and predictive manner upon impact. For example, the design of the composite beam can, through thickness of the layers and the respective fiber orientation thereof, tailor certain areas to fail early or late, thus providing a predictability to progressive failure for the reinforcing beam. The tear out performance of the fasteners attaching the reinforcing beam 25 to the mounting lugs 18 can be controlled to allow the beam 25 to conform inwardly and resist crash impact.

In addition, the composite beam 25 could be further reinforced through the utilization of 3D stitching of fibers, such as Kevlar fibers, through the multiple layers forming the outer skin 26. The cost of stitching the outer skin 26 with such fibers is substantial; therefore, selected areas might be stitched to tailor the design of the beam 25 for appropriate failure mode during crash impact.

As is reflected in FIG. 12, the composite beam 25 can be formed with an optional frame catcher 40 to further integrate the reinforcing beam 25 into the vehicle frame (not shown). The frame catcher 40 is formed with a base member 41 including a pair of prongs 42 that are inserted into the body members 29 at the end of the reinforcing beam 25 at the attachment area thereof. The frame catcher 40 is also formed with a hook member 44 that is operable to engage with a latch member (not shown) formed in the vehicle frame when the door is closed. Accordingly, an interlock mechanism (not shown) would be required to effect an engagement between the hook member 44 and the latch member in the vehicle frame in response to the door being moved to the closed position against the vehicle frame. The frame catcher 40 is preferably used at the rearward end of the reinforcing beam 25 to engage the "B Pillar" to interlock the reinforcing beam 25 with the frame of the vehicle.

Attachment of the reinforcement beam 25 is accomplished by the use of two-piece fasteners, such as push nut fasteners, that secure the beam 25 at multiple locations at the two opposing ends of the beam 25, as is best seen in FIGS. 4 and 5, to dielectrically insulate the fasteners and the reinforcement beam 25 from the magnesium inner door panel 15. The inner door panel 15 is formed with mounting lugs 18 shaped to correspond to the reinforcement beam 25 to mate therewith. The mounting lugs are formed with openings to receive the fasteners attaching the reinforcement beam 25 to the inner door panel 15.

Conventional reinforcement beam mounting is via a flat mounting panel formed at the opposing ends of the reinforcement beam 25. The shaped interface between the reinforcement beam 25 and the mounting lugs 18 on the inner door panel 15 improves the load transfer between the reinforcement beam 25 and the remaining door structure during impact situations. The extension of the corrugated shape of the reinforcement beam 25 into the attachment area at the opposing ends of the reinforcement beam 25 improves the interface between the beam 25 and the inner door 15.

Because of the potential for material degradation when using polymer composite materials, the use of the composite material is best utilized when the door assembly 10 utilizes a low temperature paint process during the paint bake cycle, or when the reinforcement beam 25 can be installed into the door assembly 10 after the paint process is completed.

The use of magnesium, even for components manufactured using high-pressure die-casting techniques, subjects the components to corrosion, which is well documented and known. Surface treatments for the magnesium components, such as chromating and anodizing, have been presented as potential methods of abating the corrosion problem. Other solutions include a titanium zirconium conversion coating in conjunction with an epoxy powder coat, which will provide a dielectric insulation to the magnesium component. This latter solution is particularly effective in conjunction with the utilization of adhesives to bond the magnesium inner panel 15 to the aluminum outer panel 12.

Attachment of the inner panel 15 to the outer panel 12 is preferably accomplished through a hemming process which forms a hem 14 to wrap the aluminum flange extending around the perimeter of the outer door panel 12 around the peripheral edge 19 of the inner door panel 15 to encapsulate the peripheral edge 19. Adhesives are applied between the outer and inner door panels 12, 15 at the hem 14 around the peripheral edge 19 to meet static and dynamic performance requirements and promote load transfer through the assembled door 10.

Aluminum was selected as the preferred material for the outer panel 12 because of the opportunity for weight reduction and concerns over differences in thermal expansion. A representative CTE value for steel is $11.7 \times 10^{-6}$ m/m/K, compared to $26.0 \times 10^{-6}$ m/m/K for magnesium and $23.4 \times 10^{-6}$ m/m/K for aluminum. Accordingly, adoption of aluminum as the material for the outer door panel 12 minimizes any thermal stresses that would be encountered during the E-coat and paint bake cycle. Execution of the hemming process to mount the inner door panel 15 to the outer door panel 12 would normally be technically challenging for an aluminum material selection due to the reduction in formability of aluminum compared to steel. The increased flange thickness at the peripheral edge 19 of the magnesium casting for the inner door panel 15, e.g. greater than 2 mm in thickness, provides a more generous radius of curvature, which eliminates any requirement to protect the hem 14 from splitting or cracking.

An important key to the development of a mixed material vehicle door assembly 10 is the provision of an affordable corrosion protection solution that offers satisfactory performance in the aggressive corrosive environment of an automotive vehicle door 10. Dielectrically insulating the magnesium inner door panel 15 from the adjoining metals of the fasteners and the outer door panel 12 provides an acceptable solution. Integration of conventional reinforcement ribs and formed shapes into the die-cast inner door panel 15 and the use of a thermoplastic module carrier 20 minimize direct contact of the magnesium with other dissimilar materials. Additional material isolation for the magnesium inner door panel 15 can be provided by pre-treating the magnesium panel 15 with a titanium zirconium conversion coating in addition to an epoxy powder coat. Another benefit of such insulation of the magnesium inner door panel 15 is the elimination of dissolution into the electro-coat tank in the vehicle assembly plant, thus opening up the possibility of processing the magnesium die-cast inner door panel 15 through existing automotive assembly lines.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

What is claimed is:

1. An anti-intrusion beam for reinforcing a vehicle door assembly comprising:
    an outer skin formed from a polymer composite material including a fiber reinforcement, said outer skin being formed from a plurality of layers of polymer composite material with the fiber reinforcement in the layers being arranged in different directions, said outer skin layer being formed into a linearly extending, transversely corrugated shape including opposing side attachment flanges to receive fasteners mounting said anti-intrusion beam to a support member; and
    an interior core formed from a foam.

2. The anti-intrusion beam of claim 1 wherein said interior core is formed from high density foam plastic.

3. The anti-intrusion beam of claim 1 wherein said linearly extending shape includes a pair of body members separated by an attachment web, each of said body members including said interior core.

4. The anti-intrusion beam of claim 3 wherein said attachment flanges and said attachment web are formed from said outer skin.

5. The anti-intrusion beam of claim 4 wherein said plastic material in said interior core is polyurethane.

6. The anti-intrusion beam of claim 5 wherein said fibers in said outer skin is selected from the group of glass and carbon.

7. A door assembly for an automotive vehicle comprising:
    an outer door panel;
    an inner door panel affixed to said inner door panel to form a cavity therebetween said inner door panel being formed with mounting lugs; and
    a linearly extending anti-intrusion beam formed of a plurality of layers of composite materials laminated together and mounted to said inner door panel within said cavity by fasteners located at opposing ends of said anti-intrusion beam, said beam including:
        a pair of body portions being formed with an interior core made of foam;
        an attachment web separating said body portions; and
        opposing side attachment flanges extending laterally, respectively, from said body portions, said attachment flanges and said attachment web receiving said fasteners for mounting said anti-intrusion beam to the mounting lugs of said inner door panel.

8. The door assembly of claim 7 wherein said beam has a transversely corrugated configuration, said mounting lugs being arranged in a corrugated pattern corresponding to said beam, said beam having attachment areas to receive said fasteners.

9. The door assembly of claim 7 wherein each said layer of said composite material includes fiber reinforcement arranged in a directional pattern, successive layers of said beam having said directional pattern oriented in different directions, thus forming an anisotropic composite reinforcing beam.

10. The door assembly of claim 7 wherein said interior core is made of high density foam plastic, said fiber reinforcement being from the group consisting of glass and carbon fibers.

11. The door assembly of claim 7 wherein a frame catcher is inserted into at least one of opposing ends of said anti-intrusion beam to interlock said anti- intrusion beam with a frame member of said automotive vehicle.

12. The door assembly of claim 11 wherein said frame catcher includes a pair of prongs that extend into said body portions and a hook member that projects away from said anti-intrusion beam to engage said frame member.

13. A method of forming a vehicle door assembly, comprising the steps of:
    forming an inner door panel with a peripheral edge extending around said inner door panel and forward and rearward mounting lugs positioned inwardly of said peripheral edge;
    providing an anti-intrusion beam formed of composite materials into a configuration having a pair of body members separated by an attachment web with a pair of attachment flanges extending laterally outwardly from said body members; and
    connecting said anti-intrusion beam to said inner door panel by attaching opposing ends of said anti-intrusion beam, respectively, to said forward and rearward mounting lugs, said providing step including the steps of:
        manufacturing said anti-intrusion beam with said reinforcement fibers being from the group consisting of glass and carbon; and
        manufacturing said body members with an interior core formed of polyurethane.

14. The method of claim 13 wherein said providing step further includes the step of manufacturing said anti-intrusion beam in a transversely corrugated configuration including attachment areas for connection to said inner door panel, said forming step including the step of arranging said mounting lugs in a corrugated configuration corresponding to said anti-intrusion beam.

15. The method of claim 14 wherein said providing step further includes the step of:
    laminating said anti-intrusion beam with a plurality of layers of composite material incorporating reinforcement fibers extending in a directional orientation to form an anisotropic beam.

* * * * *